United States Patent
Mukhopadhyay et al.

(10) Patent No.: US 10,641,174 B2
(45) Date of Patent: May 5, 2020

(54) ROTOR SHAFT COOLING

(71) Applicant: General Electric Company, Schenectady, NY (US)

(72) Inventors: Debabrata Mukhopadhyay, Bangalore (IN); Sanjeev Kumar Jain, Bangalore (IN); Sendilkumaran Soundiramourty, Bangalore (IN); Rajesh Mavuri, Bangalore (IN); Jagdish Prasad Tyagi, Bangalore (IN)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 15/408,465

(22) Filed: Jan. 18, 2017

(65) Prior Publication Data

US 2018/0202360 A1 Jul. 19, 2018

(51) Int. Cl.
*F02C 7/18* (2006.01)
*F02C 7/28* (2006.01)
*F01D 25/24* (2006.01)
*F01D 25/12* (2006.01)
*F01D 5/08* (2006.01)

(52) U.S. Cl.
CPC ............... *F02C 7/18* (2013.01); *F01D 5/085* (2013.01); *F01D 25/12* (2013.01); *F01D 25/24* (2013.01); *F02C 7/28* (2013.01); *F05D 2240/60* (2013.01); *F05D 2260/213* (2013.01); *Y02E 20/16* (2013.01)

(58) Field of Classification Search
CPC .... F02C 7/18; F02C 7/28; F01D 5/085; F01D 5/12; F01D 5/24; F01D 25/12; F01D 25/14; F01D 11/003; F01D 9/06; F01D 9/065; F04D 29/04; F04D 29/5806; F04D 29/582; F04D 29/5846; F05D 2240/60; F05D 2260/213; F05D 2260/205
USPC ............................................................ 415/1
See application file for complete search history.

(56) References Cited

U.S. PATENT DOCUMENTS

| | | | |
|---|---|---|---|
| 3,647,313 A | 3/1972 | Koff | |
| 4,573,324 A | 3/1986 | Tischer et al. | |
| 5,340,274 A | 8/1994 | Cunha | |
| 5,611,197 A | 3/1997 | Bunker | |
| 5,685,158 A | 11/1997 | Lenahan et al. | |
| 5,685,693 A | 11/1997 | Sexton et al. | |
| 5,695,319 A * | 12/1997 | Matsumoto | F01D 5/085 416/95 |
| 5,853,285 A | 12/1998 | Miller et al. | |

(Continued)

*Primary Examiner* — Kenneth J Hansen
*Assistant Examiner* — Justin A Pruitt
(74) *Attorney, Agent, or Firm* — Dority & Manning, P.A.

(57) ABSTRACT

A gas turbine casing with an internal heat exchange system. The gas turbine extends between an inlet section and an exhaust section and defines a downstream direction from the inlet section to the exhaust section. The casing includes a forward end, an aft end downstream of the forward end, a first exterior surface facing radially outward, a second exterior surface facing radially inward, and an internal body at least partially defined between the first exterior surface and the second exterior surface. The heat exchange system includes an inlet and an outlet formed in an exterior surface of the casing proximate the aft end, a supply bore extending upstream from the inlet through the interior body of the casing, and a return bore extending downstream to the outlet through the interior body of the casing.

13 Claims, 4 Drawing Sheets

(56) References Cited

U.S. PATENT DOCUMENTS

| | | |
|---|---|---|
| 6,295,803 B1 | 10/2001 | Bancalari |
| 7,993,102 B2 | 8/2011 | Desai et al. |
| 8,132,417 B2 | 3/2012 | Steiger et al. |
| 8,137,069 B2 | 3/2012 | Khanin et al. |
| 8,192,141 B1 | 6/2012 | Dale |
| 8,210,797 B2 | 7/2012 | Dueckershoff et al. |
| 8,210,815 B2 | 7/2012 | Bezencon et al. |
| 8,231,349 B2 | 7/2012 | Naik et al. |
| 8,272,220 B2 | 9/2012 | Haehnle et al. |
| 8,281,486 B2 | 10/2012 | Storch et al. |
| 8,327,647 B2 | 12/2012 | Guidati et al. |
| 8,353,663 B2 | 1/2013 | Arzel et al. |
| 8,360,725 B2 | 1/2013 | Anguisola McFeat et al. |
| 8,434,313 B2 | 5/2013 | Tschuor et al. |
| 8,444,375 B2 | 5/2013 | Naik et al. |
| 8,444,376 B2 | 5/2013 | Krueckels et al. |
| 8,459,934 B2 | 6/2013 | Hofmann et al. |
| 8,479,524 B2 | 7/2013 | Poyyapakkam et al. |
| 8,516,823 B2 | 8/2013 | Tschuor et al. |
| 8,523,526 B2 | 9/2013 | Riazantsev et al. |
| 8,550,783 B2 | 10/2013 | Dietrich et al. |
| 8,764,395 B2 | 7/2014 | Wilhelm et al. |
| 8,791,360 B2 | 7/2014 | Fried et al. |
| 8,801,366 B2 | 8/2014 | Dueckershoff et al. |
| 8,801,371 B2 | 8/2014 | Kreiselmaier et al. |
| 8,834,096 B2 | 9/2014 | Khanin |
| 8,875,483 B2 | 11/2014 | Wettstein |
| 8,932,007 B2 | 1/2015 | Khanin et al. |
| 8,974,174 B2 | 3/2015 | Khanin et al. |
| 8,979,470 B2 | 3/2015 | Riazantsev et al. |
| 8,979,479 B2 | 3/2015 | Steiger et al. |
| 8,979,482 B2 | 3/2015 | Khanin et al. |
| 9,022,726 B2 | 5/2015 | Szwedowicz et al. |
| 9,051,838 B2 | 6/2015 | Wardle et al. |
| 9,062,555 B2 | 6/2015 | Schnieder et al. |
| 9,097,115 B2 | 8/2015 | Naryzhny et al. |
| 9,145,774 B2 | 9/2015 | Fuchs et al. |
| 9,163,515 B2 | 10/2015 | Steiger et al. |
| 9,188,011 B2 | 11/2015 | Khanin |
| 9,255,479 B2 | 2/2016 | Pauli et al. |
| 9,267,382 B2 | 2/2016 | Szwedowicz et al. |
| 9,297,311 B2 | 3/2016 | Hellat et al. |
| 2009/0074589 A1* | 3/2009 | Fang ............... F01D 25/12 416/97 R |
| 2010/0178168 A1 | 7/2010 | Desai et al. |
| 2013/0092350 A1* | 4/2013 | N. ................ F01D 5/084 165/51 |
| 2013/0167551 A1* | 7/2013 | Subramaniyan ........ F01D 5/187 60/795 |
| 2015/0323186 A1* | 11/2015 | Xu ................. F02C 7/224 60/782 |
| 2016/0123327 A1 | 5/2016 | Collins et al. |
| 2016/0251962 A1* | 9/2016 | Hashimoto ............ F02C 7/18 60/806 |

\* cited by examiner

ROTOR SHAFT COOLING

FIELD

The present subject matter relates generally to a gas turbine engine. More particularly, the present disclosure relates to a system and method for cooling a rotor shaft of a gas turbine engine.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

During operation of the gas turbine, various components in the system are subjected to high temperatures. For example, high temperature combustion gases are produced in the combustion section such that various parts of the gas turbine downstream of the combustion section are subjected to high temperatures. Such parts of the gas turbine include the portion(s) of the rotor shaft that are adjacent to and downstream of the combustion section.

BRIEF DESCRIPTION

Aspects and advantages are set forth below in the following description, or may be obvious from the description, or may be learned through practice. Additional aspects and advantages will be set forth in part in the following description, or may be apparent from the description, or may be learned through practice.

In a first exemplary embodiment, a casing for a gas turbine is provided. The gas turbine extends between an inlet section and an exhaust section and defines a downstream direction from the inlet section to the exhaust section. The casing includes a forward end, an aft end downstream of the forward end, a first exterior surface facing radially outward, a second exterior surface opposing the first exterior surface, the second exterior surface facing radially inward, an internal body at least partially defined between the first exterior surface and the second exterior surface, and a heat exchange system comprising an inlet formed in one of the first exterior surface and the second exterior surface proximate the aft end of the casing, an outlet formed in one of the first exterior surface and the second exterior surface proximate the aft end of the inner casing, a supply bore extending upstream from the inlet through the interior body of the casing, and a return bore extending downstream to the outlet through the interior body of the casing.

In a second exemplary embodiment, a gas turbine extending between an inlet section and an exhaust section and defining a downstream direction from the inlet section to the exhaust section is provided. The gas turbine also includes a compressor, a turbine section, the exhaust section downstream of the turbine section, a plurality of combustors disposed downstream from the compressor and upstream from the turbine, a rotor shaft extending between the turbine section and the compressor, a casing between the rotor shaft and the plurality of combustors, a high pressure packing seal between the rotor shaft and the inner casing, a heat exchange system defined in the casing, the heat exchange system comprising an inlet formed in the casing proximate an aft end of the casing, an outlet formed in the casing proximate the aft end of the casing, a supply conduit extending through the casing upstream from the inlet, and a return conduit extending through the casing downstream to the outlet, and a cooling fluid source in fluid communication with at least one of the inlet and the outlet, wherein the rotor shaft is in thermal communication with the heat exchange system of the casing.

In a third exemplary embodiment, a method of cooling a rotor shaft of a gas turbine is provided. The gas turbine also includes a compressor, a turbine section, a plurality of combustors disposed downstream from the compressor and upstream from the turbine, the rotor shaft extending between the turbine and the compressor, a casing between the rotor shaft and the plurality of combustors and a high pressure packing seal disposed in a high pressure packing seal cavity between the rotor shaft and the casing. The method includes directing a supply stream of a cooling fluid within the casing in an upstream direction from an inlet proximate to an aft end of the casing and directing a return stream of the cooling fluid within the casing in a downstream direction to an outlet proximate the aft end of the casing, whereby heat is transferred from the rotor shaft to the cooling fluid.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
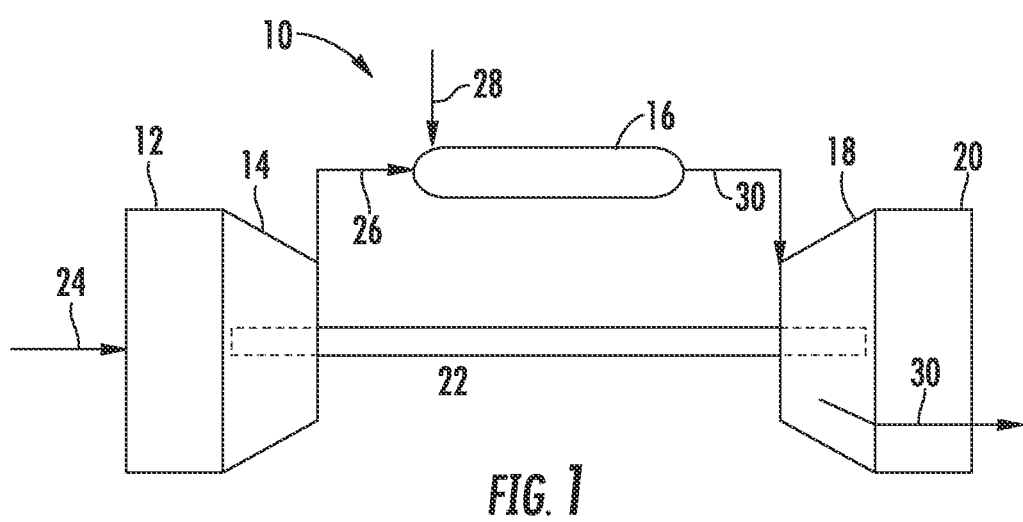
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a land-based power generating gas turbine combustor for purposes of illustration, one of ordinary skill in the art will readily appreciate that embodiments of the present disclosure may be applied to any style or type of turbomachine and are not limited to land-based power generating gas turbines unless specifically recited.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. Another portion of the compressed air 26 may be used as a cooling medium for cooling the various components of the turbine section 18. The combustion gases 30 flow from the combustor 16 into the turbine section 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20. In some embodiments, e.g., wherein the gas turbine 10 forms part of a combined cycle power generation plant, the exhaust section 20 may include or be in fluid communication with a heat recovery steam generator (HRSG) 400. Exhaust gases may be directed through the HRSG 400. In such embodiments, the exhaust gases supplied to the HRSG 400 may, in turn, be used as a heat source for generating high-pressure, high-temperature steam. The steam may then be at least partially recirculated through turbine 10 for cooling various components thereof and/or at least partially passed through a steam turbine (not shown) in order to generate power.

Figure 2:
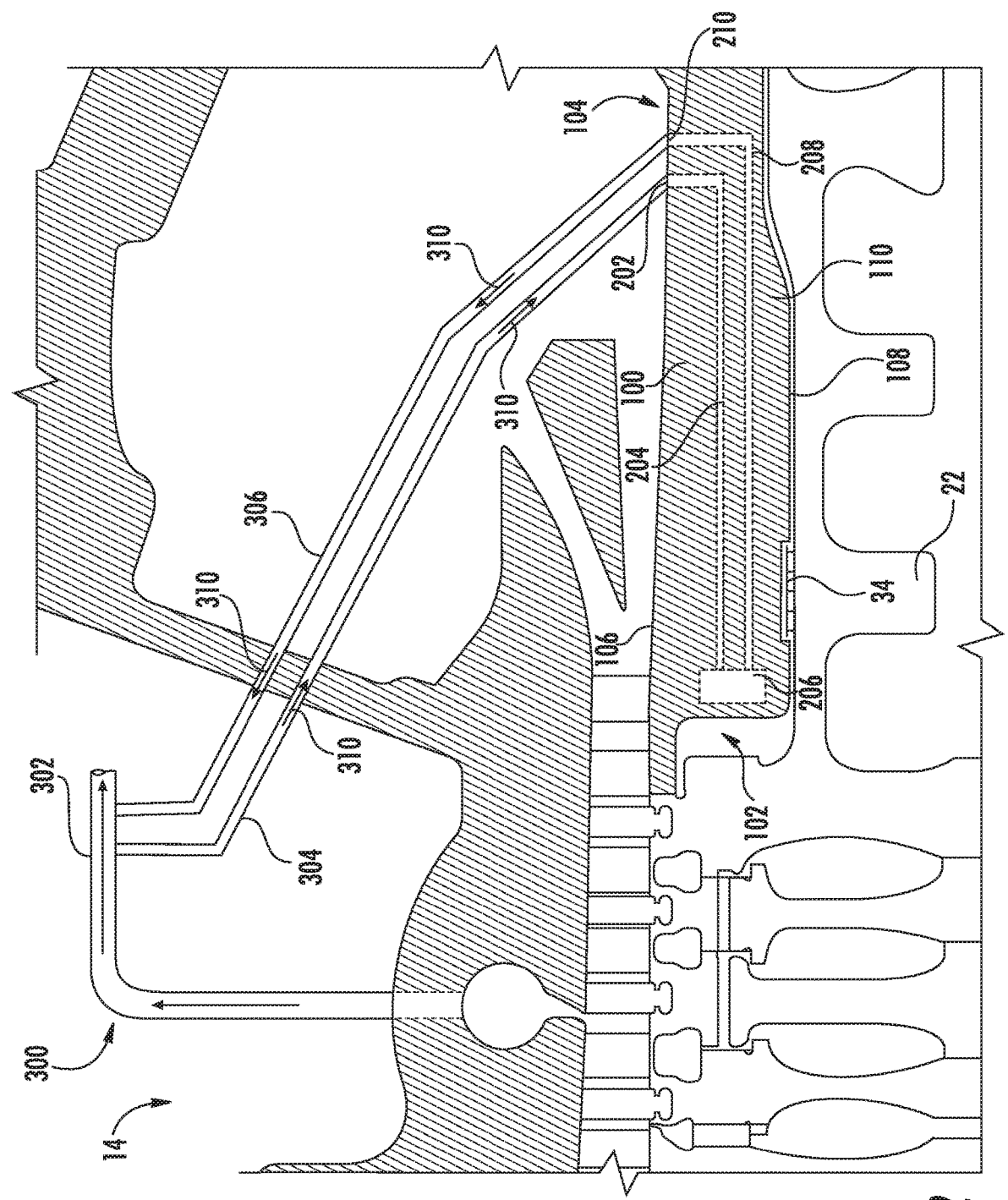
FIG. 2 is a simplified cross-section side view of a portion of an exemplary gas turbine as may incorporate various embodiments of the present disclosure.

As may be seen in FIG. 2, gas turbine 10 includes multiple casings which may enclose and/or separate various components of the gas turbine 10. Such casings may include an inner casing 100 which generally surrounds a portion of rotor shaft 22. In particular, the illustration in FIG. 2 includes a portion of rotor shaft 22 proximate to the downstream end of compressor 14 and the upstream end of turbine section 18. As may be seen in FIG. 2, the illustrated portion of rotor shaft 22 abuts a high-pressure packing seal (HPPS) 34 between the shaft 22 and inner casing 100. In some embodiments, the HPPS 34 may be disposed in an HPPS cavity of the inner casing 100, as illustrated in FIG. 2.

As shown in FIG. 2, a casing 100 having a heat exchange system 200 therein may, in some exemplary embodiments, be inner casing 100. Inner casing 100 may extend between a forward end 102 and an aft end 104 downstream of the forward end 102. Inner casing 100 may also include a first exterior surface 106 facing radially outward and a second exterior surface 108 opposing the first exterior surface, i.e., the second exterior surface 108 may face radially inward, with an internal body 110 of casing 100 at least partially defined between the first exterior surface 106 and the second exterior surface 108.

Heat exchange system 200 may include an inlet 202 formed in one of the first exterior surface 106 and the second exterior surface 108 proximate the aft end 104 of the casing 100, with a supply bore 204 extending upstream (with respect to the overall flow direction of working fluid/combustion gases through the gas turbine) from the inlet 202 through the interior body 110 of the casing 100. In other words, because inlet 202 is positioned in or near aft end 104 and supply bore 204 extends from the inlet 202 through internal body 110 of casing 100, the supply bore 204 extends upstream from the inlet 202. Thus, cooling fluid 310 flowing from inlet 202 into supply bore 204 will flow upstream, that is, against the prevailing flow direction of compressed air 26 and/or combustion gases 30 through the gas turbine 10.

Heat exchange system 200 may further include an outlet 210 formed in one of the first exterior surface 106 and the second exterior surface 108 proximate the aft end 104 of the casing 100, with a return bore 208 extending downstream (with respect to the overall flow direction of working fluid/combustion gases through the gas turbine) to the outlet 210 through the interior body 110 of the casing 100.

As illustrated FIG. 2, in some exemplary embodiments, the internal body 110 of inner casing 100 may be partially hollow while supply bore 204 and return bore 208 extend through a solid portion of the internal body 110. In other exemplary embodiments, the internal body 110 of inner casing 100 may be entirely solid.

In the exemplary embodiment illustrated in FIG. 2, the supply bore 204 and the return bore 208 are shown with some separation between them in the radial (i.e., vertical on the page as illustrated in FIG. 2) direction, with supply bore 204 radially outward (above, as illustrated in FIG. 2) return bore 208. In some exemplary embodiments, such as the embodiment illustrated in FIG. 3, the supply bore 204 and the return bore 208 may have some radial separation with the return bore 208 radially outward of the supply bore 204. In other embodiments, the supply bore 204 and the return bore 208 may be radially aligned.

In some embodiments, heat exchange system 200 may further include a plenum 206 defined within the internal body 110 of the casing 100 proximate to the forward end 102 of the casing 100. In some embodiments wherein the heat exchange system 200 includes a plenum 206, the supply bore 204 may extend from the inlet 202 to the plenum 206. In some embodiments wherein the heat exchange system 200 includes a plenum 206, the return bore 208 may extend from the plenum 206 to the outlet 210.

Heat exchange system 200, and in particular inlet 202 and/or outlet 210 thereof, may be in fluid communication with a cooling fluid source 300. Accordingly, a cooling fluid 310 may be provided to and/or circulated through casing 100 and heat exchange system 200. As may be seen in FIG. 2, casing 100 is disposed proximate to rotor shaft 22, such that the rotor shaft 22 is in thermal communication with the heat exchange system 200 of the casing 100. Accordingly, heat may be transferred from the rotor shaft 22 to the cooling fluid 310 and the heat exchange system 200 may help cool the rotor shaft 22.

In various embodiments, several different cooling fluids 310 and/or cooling fluid sources 300 are possible. For example, in various embodiments, the cooling fluid 310 may be air, steam, liquid water, or combinations thereof, among other possibilities.

The compressor section 14 includes a plurality of stages that progressively increase the pressure of the working fluid 26. As the pressure of the working fluid 26 increases, the temperature of the working fluid 26 increases as well. Nonetheless, compressed working fluid 26 from the compressor 14 is cooler than the high temperature combustion gases 30. A such, compressed working fluid 26 may still be useful for reducing the temperature of gas turbine components which are subjected to high temperatures. In some embodiments, compressed working fluid 26 may be drawn from an intermediate stage of the compressor 14 for use as cooling fluid 310, e.g., as illustrated in FIG. 2, the cooling fluid source 300 may be a cooling air system 300 which provides cooling air from an intermediate stage of the compressor 14 to at least one nozzle of the turbine section 18. In such embodiments, the cooling air system 300 may be in fluid communication with the inlet 202 of the heat exchange system 200 to supply cooling fluid 310 to heat exchange system 200. Further in some such embodiments, the cooling air system 300 may be in fluid communication with the outlet 210 of the heat exchange system 200 to return cooling fluid 310 to cooling air system 300 for cooling the at least one nozzle of the turbine section 18. In such embodiments, the compressed working fluid 26 from the intermediate stage may have a lower pressure and lower temperature than compressed working fluid 26 at an outlet of the compressor 14.

Further illustrated in FIG. 2, in some embodiments, the cooling air system 300 may include a first conduit 302 extending between the intermediate stage of the compressor 14 and the turbine section 18, a second conduit 304 extending between the first conduit 302 and the inlet 202 of the heat exchange system 200 and a third conduit 306 extending between the outlet 210 of the heat exchange system 200 and the first conduit 302.

Figure 3:
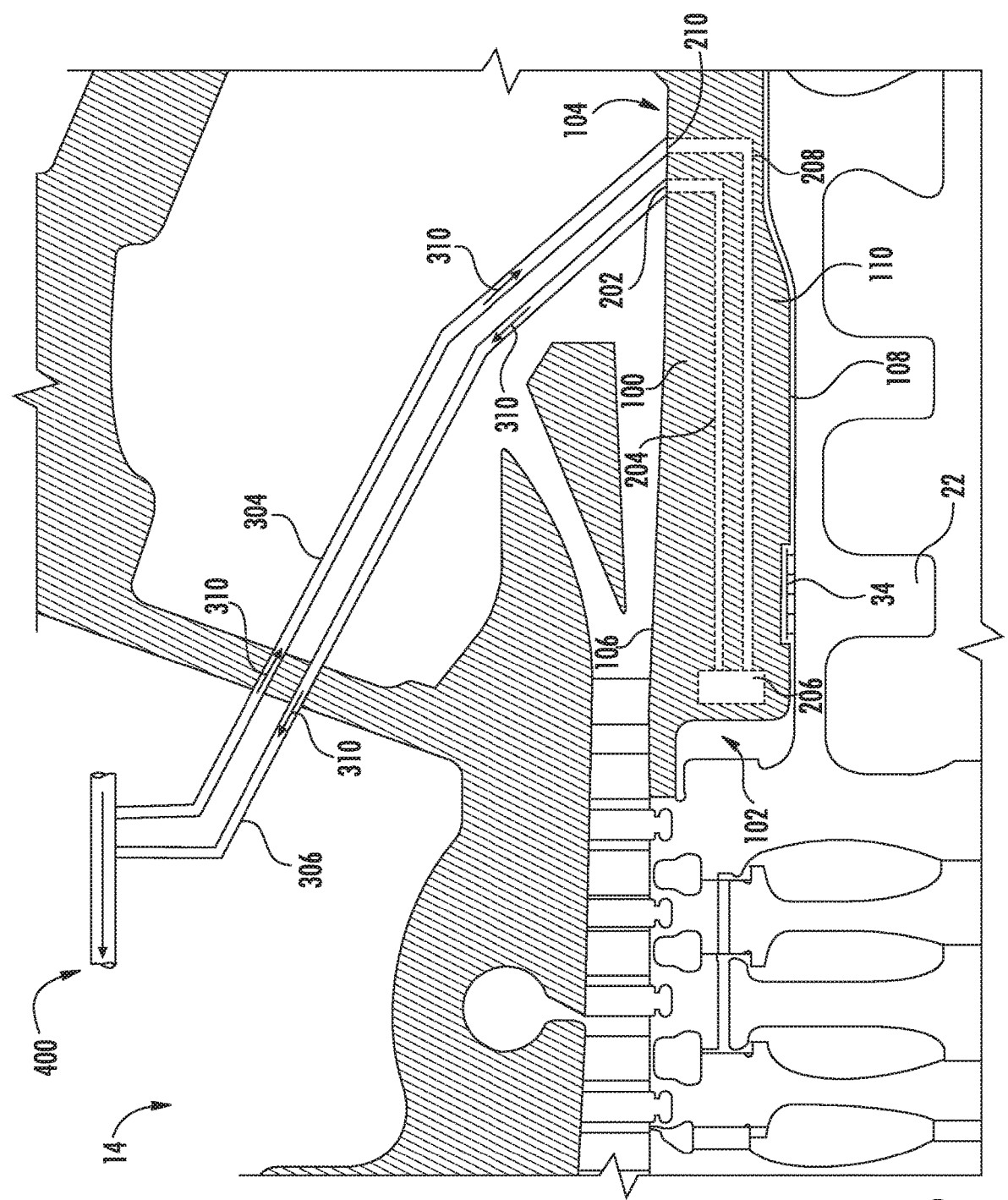
FIG. 3 is a simplified cross-section side view of a portion of an exemplary gas turbine as may incorporate various embodiments of the present disclosure.

As illustrated FIG. 3, in some exemplary embodiments, the cooling fluid source 300 may be the HRSG 400. In such embodiments, the cooling fluid 310 may be at least a portion of the steam generated by the HRSG 400.

Figure 4:
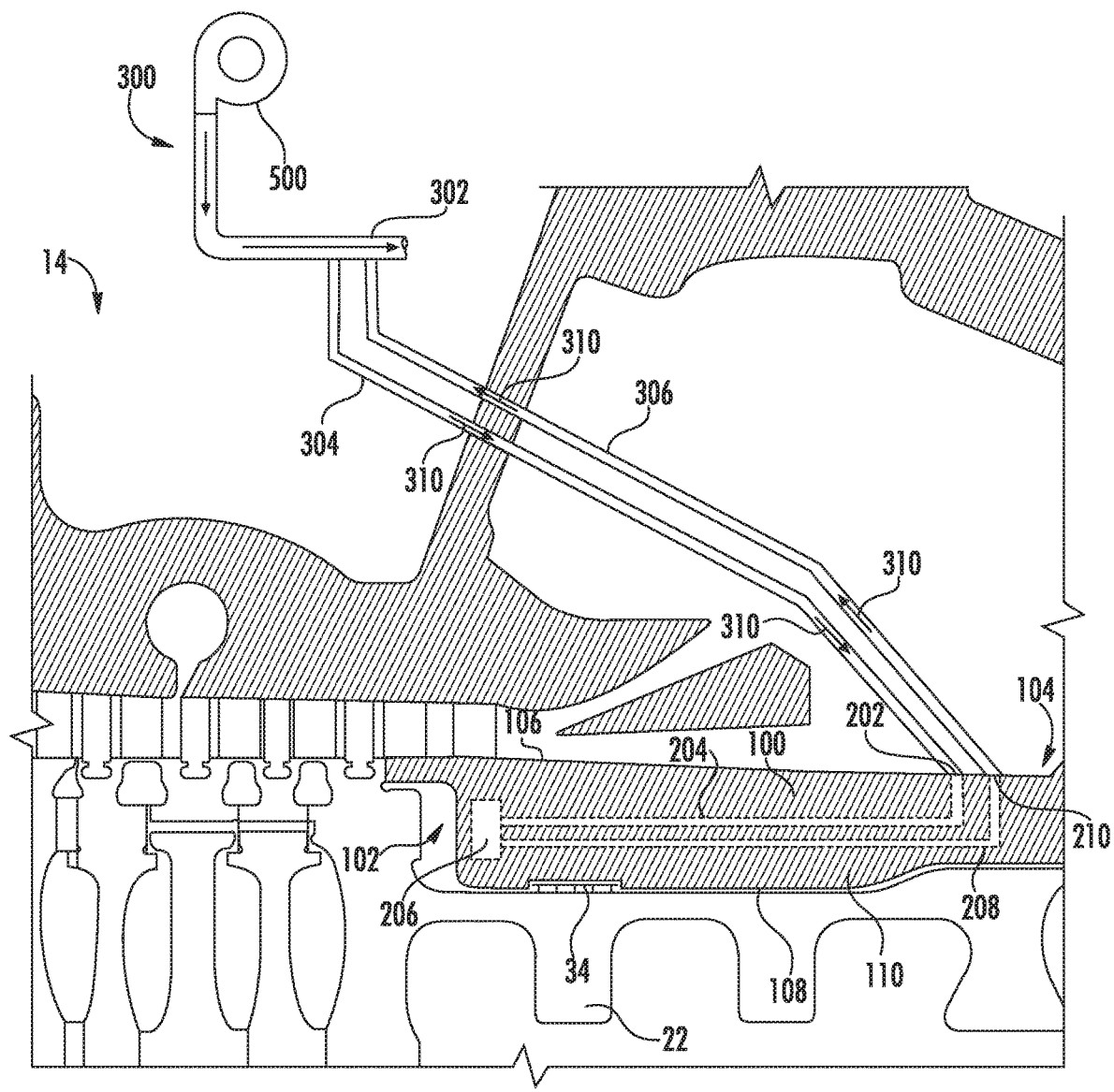
FIG. 4 is a simplified cross-section side view of a portion of an exemplary gas turbine as may incorporate various embodiments of the present disclosure.

As illustrated FIG. 4, in some exemplary embodiments, the cooling fluid source 300 may be an external blower 500. In such embodiments, the cooling fluid 310 may be air.

Some exemplary embodiments may include a method of cooling a rotor shaft 22 of a gas turbine 10. An exemplary gas turbine 10 with which such methods may be employed may include a compressor 14, a turbine section 18, a plurality of combustors 16 disposed downstream from the compressor 14 and upstream from the turbine 18, a rotor shaft 22 extending between the turbine 18 and the compressor 14, a casing 100 between the rotor shaft 22 and the plurality of combustors 16 and a high pressure packing seal 34 disposed in a high pressure packing seal cavity between the rotor shaft 22 and the casing 100. One or more exemplary embodiments of such method may include directing a supply stream of a cooling fluid 310 within the casing 100 in an upstream direction from an inlet 202 proximate to an aft end 104 of the casing 100 and directing a return stream of the cooling fluid 310 within the casing 100 in a downstream direction to an outlet 210 proximate the aft end 104 of the casing 100, whereby heat is transferred from the rotor shaft 22 to the cooling fluid 310.

In some exemplary embodiments, the cooling fluid 310 may be a first cooling fluid, and the method also include a step of injecting a stream of a second cooling fluid, e.g., steam, into the high pressure packing seal cavity. In some exemplary embodiments, the step of directing a supply stream may also include directing the cooling fluid 310 to an internal plenum 206 defined within the casing 100 proximate a forward end 102 of the casing 100. In some exemplary embodiments, the step of directing a return stream may also include directing the cooling fluid 310 from the internal plenum 206 defined within the casing 100 proximate the forward end 102 of the casing 100. In some exemplary embodiments, such method may include directing a stream of cooling fluid 310 from an intermediate stage of the compressor 14 to the inlet 202 so as to form the supply stream of cooling fluid 310 and/or directing a stream of cooling fluid 310 from the outlet 210 to at least one nozzle of the turbine section 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine extending between an inlet section and an exhaust section and defining a downstream direction from the inlet section to the exhaust section, the gas turbine further comprising:
    a compressor;
    a turbine section, the exhaust section downstream of the turbine section;
    a plurality of combustors disposed downstream from the compressor and upstream from the turbine;
    a rotor shaft extending between the turbine section and the compressor;

an inner casing between the rotor shaft and the plurality of combustors, the inner casing surrounding a portion of the rotor shaft between a downstream end of the compressor and an upstream end of the turbine section;

a high pressure packing seal between the rotor shaft and the inner casing;

a heat exchange system defined in the inner casing, the heat exchange system comprising an inlet formed in the inner casing proximate an aft end of the casing, an outlet formed in the inner casing proximate the aft end of the casing, a supply conduit extending through the inner casing upstream from the inlet, and a return conduit extending through the inner casing downstream to the outlet; and a cooling fluid source in fluid communication with at least one of the inlet and the outlet the cooling fluid source comprising a cooling air system configured to provide cooling air from an intermediate stage of the compressor to the turbine section, the cooling air system comprising:

a first conduit extending from an intermediate stage of the compressor; and a second conduit extending from the first conduit to the inlet of the heat exchange system, wherein the first conduit and the second conduit define a direct flow path for cooling fluid from the intermediate stage of the compressor to the inlet of the heat exchange system;

wherein the rotor shaft is in thermal communication with the heat exchange system of the inner casing.

2. The gas turbine of claim 1, wherein the heat exchange system further comprises a plenum defined within the inner casing proximate to a forward end of the inner casing.

3. The gas turbine of claim 2, wherein the supply conduit extends from the inlet to the plenum.

4. The gas turbine of claim 2, wherein the return conduit extends from the plenum to the outlet.

5. The gas turbine of claim 1, wherein the cooling air system is in fluid communication with the outlet of the heat exchange system.

6. The gas turbine of claim 5, wherein the first conduit of the cooling air system extends between the intermediate stage of the compressor and the turbine section, and the cooling air system further comprises a third conduit extending between the outlet of the heat exchange system and the first conduit.

7. A method of cooling a rotor shaft of a gas turbine, the gas turbine extending between an inlet section and an exhaust section, the gas turbine defining a downstream direction from the inlet section to the turbine section, the gas turbine further comprising a compressor, a turbine section with the exhaust section downstream of the turbine section, a plurality of combustors disposed downstream from the compressor and upstream from the turbine, the rotor shaft extending between the turbine section and the compressor, an inner casing between the rotor shaft and the plurality of combustors, the inner casing surrounding a portion of the rotor shaft between a downstream end of the compressor and an upstream end of the turbine section, and a high pressure packing seal disposed in a high pressure packing seal cavity between the rotor shaft and the casing, the method comprising:

directing a stream of cooling fluid from an intermediate stage of the compressor into a first conduit;

directing a portion of the stream of cooling fluid into a second conduit to form a supply stream of cooling fluid, whereby the supply stream of cooling fluid flows directly from the intermediate stage of the compressor to an inlet of a heat exchange system defined in the inner casing along a direct flow path defined by the first conduit and the second conduit;

directing the supply stream of the cooling fluid within the inner casing in an upstream direction from the inlet proximate to an aft end of the inner casing; and directing a return stream of the cooling fluid within the inner casing in a downstream direction to an outlet of the heat exchange system proximate the aft end of the inner casing;

whereby heat is transferred from the rotor shaft to the cooling fluid.

8. The method of claim 7, wherein the cooling fluid is a first cooling fluid, the method further comprising a step of injecting a stream of a second cooling fluid into the high pressure packing seal cavity.

9. The method of claim 8, wherein the second cooling fluid is steam.

10. The method of claim 7, wherein the step of directing a supply stream further comprises directing the cooling fluid to an internal plenum defined within the casing proximate a forward end of the casing.

11. The method of claim 7, wherein the step of directing a return stream further comprises directing the cooling fluid from an internal plenum defined within the casing proximate a forward end of the casing.

12. The method of claim 7, further comprising directing a stream of cooling fluid from the outlet to the turbine section.

13. The method of claim 7, wherein the cooling fluid is liquid water.

* * * * *